United States Patent
Apfelroth

(10) Patent No.: US 9,336,513 B2
(45) Date of Patent: May 10, 2016

(54) METHOD FOR AUTOMATED ACKNOWLEDGEMENT OF ELECTRONIC MESSAGE

(76) Inventor: Stephen Apfelroth, Norwalk, CT (US)

(*) Notice: Subject to any disclaimer, the term of this patent is extended or adjusted under 35 U.S.C. 154(b) by 1879 days.

(21) Appl. No.: 12/360,375

(22) Filed: Jan. 27, 2009

(65) Prior Publication Data

US 2009/0248817 A1 Oct. 1, 2009

Related U.S. Application Data

(60) Provisional application No. 61/072,343, filed on Mar. 31, 2008.

(51) Int. Cl.
*G06F 15/16* (2006.01)
*G06Q 10/10* (2012.01)
*H04L 12/58* (2006.01)

(52) U.S. Cl.
CPC .......... *G06Q 10/107* (2013.01); *H04L 12/5875* (2013.01); *H04L 12/5885* (2013.01)

(58) Field of Classification Search
CPC ............. G06Q 10/107; H04L 12/5875; H04L 12/5885
USPC .............. 709/200–229; 707/9, 505, 3, 5, 509; 705/1, 28, 37, 44, 10; 370/230, 370/260–269, 465, 235, 248
See application file for complete search history.

(56) References Cited

U.S. PATENT DOCUMENTS

| | | | | | |
|---|---|---|---|---|---|
| 3,544,722 | A | * | 12/1970 | Feigl | H04M 1/27 340/501 |
| 5,625,880 | A | * | 4/1997 | Goldburg | H04B 17/309 340/7.22 |
| 2002/0111198 | A1 | * | 8/2002 | Heie | G08B 3/1041 455/574 |
| 2004/0024660 | A1 | * | 2/2004 | Ganesh | G06Q 10/087 705/28 |
| 2004/0186884 | A1 | * | 9/2004 | Dutordoir | 709/206 |
| 2006/0010218 | A1 | * | 1/2006 | Turcotte | H04L 12/1859 709/206 |
| 2006/0166702 | A1 | * | 7/2006 | Dietz et al. | 455/566 |
| 2009/0075685 | A1 | * | 3/2009 | Beyer, Jr. | H04M 1/72547 455/466 |
| 2009/0176476 | A1 | * | 7/2009 | Foladare | H04M 3/42374 455/404.2 |
| 2009/0248817 | A1 | * | 10/2009 | Apfelroth | 709/206 |

FOREIGN PATENT DOCUMENTS

WO WO96/35267 * 3/1996 ............... H04B 7/00

* cited by examiner

Primary Examiner — Oleg Survillo

(57) ABSTRACT

An electronic messaging device adapted to receive electronic messages from a sender. The electronic messaging device has a controller, a transmitter and receiver unit connected to the controller, a user interface connected to the controller, and a body detection device connected to the controller. After receipt of a notification message from the sender, the transmitter sends an acknowledgement message to the sender when the body detection device detects the presence of a recipient of the notification message.

20 Claims, 3 Drawing Sheets

METHOD FOR AUTOMATED ACKNOWLEDGEMENT OF ELECTRONIC MESSAGE

This application claims the benefit of U.S. Provisional Patent Application Ser. No. 61/072,343 filed Apr. 10, 2008 which is incorporated by reference herein in its entirety.

BACKGROUND

The disclosed embodiments relate to automated acknowledgement of electronic message receipt and, more particularly, to automated acknowledgement of electronic message receipt by confirmation that that messaging device is being carried by recipient.

BRIEF DESCRIPTION OF RELATED DEVELOPMENTS

Electronic messaging devices, such as cell phones or pagers, are utilized to notify a user of multiple types of messages. An example of a messaging device application involves notifying medical personnel of conditions such as critical laboratory values. In some cases, the recipient may find it advantageous to deny such notification or to delay acknowledgement, for example, to reduce potential liability. Thus, there is a desire for automated acknowledgement of electronic message receipt.

SUMMARY

In accordance with one exemplary embodiment, an electronic messaging device adapted to receive electronic messages from a sender is provided. The electronic messaging device has a controller, a transmitter and receiver unit connected to the controller, a user interface connected to the controller, and a body detection device connected to the controller. After receipt of a notification message from the sender, the transmitter sends an acknowledgement message to the sender when the body detection device detects the presence of a recipient of the notification message.

In accordance with another exemplary embodiment, an electronic messaging device adapted to receive electronic messages from a sender is provided. The electronic messaging device has a controller, a transmitter and receiver unit connected to the controller, a user interface connected to the controller, and a detection device connected to the controller, the detection device adapted to detect that the electronic messaging device is being carried by a user. After receipt of a notification message from a sender, the transmitter sends an acknowledgement message to the sender when the detection device detects that the electronic messaging device is being carried by the user.

In accordance with an exemplary method, a method for automated acknowledgement of electronic message receipt is provided having steps of providing an electronic messaging device having a transmitter and receiver unit and a body detection device, sending a notification message to the receiver from a sender, receiving the notification message, and sending an acknowledgement message from the transmitter to the sender when the body detection device detects the presence of a recipient of the notification message.

BRIEF DESCRIPTION OF THE DRAWINGS

The foregoing aspects and other features of the exemplary embodiments are explained in the following description, taken in connection with the accompanying drawings, wherein.

DETAILED DESCRIPTION

Figure 1:
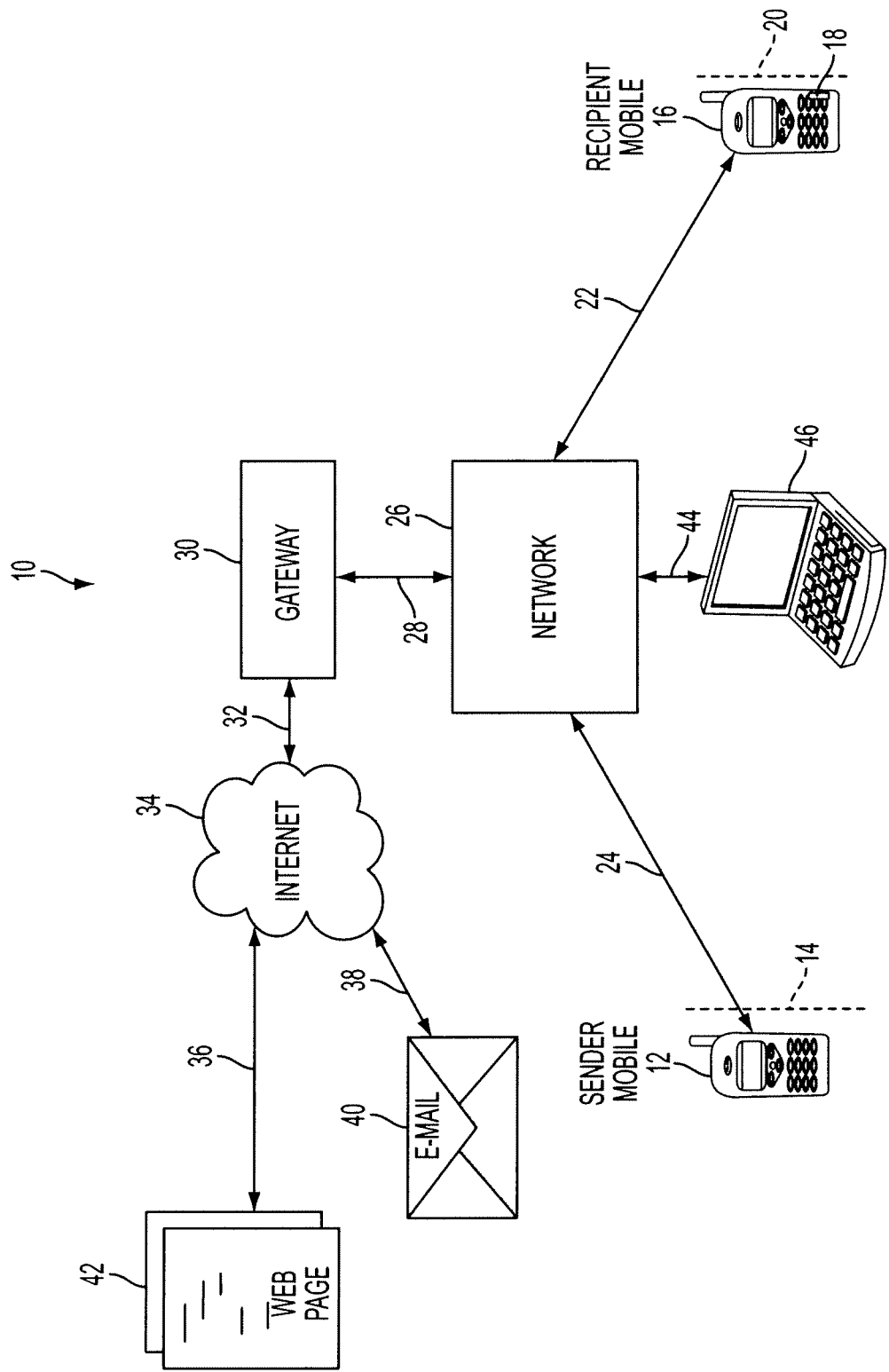
FIG. 1 is a schematic diagram of an automated acknowledgement message receipt system.

Referring now to FIG. 1, there is shown a schematic diagram of an automated acknowledgement message receipt system 10. The features of the disclosed embodiments, as will be described below, are equally applicable to any desired type of messaging system and the configuration of the system 10 in the exemplary embodiment illustrated in FIG. 1 is merely representative with the features of the exemplary embodiments described below with specific reference to the figures are equally applicable to any suitable messaging system with any desired configuration.

The disclosed embodiments are for the combination of an electronic messaging device 16, together with a method of detecting that such device is actually being carried on the body 20 of an intended recipient 20. Here, a body-detection, motion, infrared or heat sensor device 18 is incorporated into an electronic messaging device 16, for the purpose of automatically acknowledging that a message was received while the device was being actively carried on the body 20 of a person. There are many urgent notifications that must be acknowledged by intended recipients, but there are circumstances in which the recipient may find it advantageous to deny having received such notification, or to delay acknowledgement; for example, in order to reduce potential liability. In such circumstances, it is often difficult to rely on the voluntary acknowledgement of messages on the messaging device.

As an example, an exemplary use for this scheme is for notification of doctors regarding critical laboratory values, but by no means is the application intended to be limited to this circumstance. The disclosed embodiments combine a portable two-way electronic messaging device 16, for example, cellular phone, or Blackberry-type pager with a method of detecting that the device is actually being carried upon the body of a person. Such methods may include devices 18 such as motion-detection devices or body heat-detection devices, either singly or in combination. When the message is received, the device 16 would automatically send a confirmation that the message is correctly received by returning the entire message, or a mathematically unique hash/ID of the message along with device ID, time-stamp, and confirmation that the device is actively being carried on the body of recipient 20. Such messaging and acknowledgement may have incorporated encryption and secure digital signature schemes.

As seen in FIG. 1, an exemplary messaging service system architecture is shown to illustrate an embodiment of the present invention. A message service center 26, such as a cellular message service node and mobile network stores message service profiles detailing the preferences and subscription details of each subscriber with respect to messages for each of the mobile units which it services. The service center 26 uses a standard protocol to communicate with any external message entities, such as a server, an e-mail gateway or other type of messaging gateway 30, a voice processing system for handling voicemail alerts, a paging system, etc. E-mail gateway 30 is connected 32 to network 34, such as the Internet and is used as a gateway for e-mail 40 or web pages 42 or otherwise. Alternately, service center 26 may interface directly 44 with a pc 46 or other application via wireless communication or networked communication or via the internet.

The service center 26 may ascertain whether a delivery acknowledgement is desired, for example from data received, from the content of the particular message, or from stored preferences of the originator 14 of the message. For example, the preferences of the originator 14 can be encoded in the message and service center 26 could parse the message and, based on the content of the message, decide whether and how to send a delivery acknowledgement. Service center 26 has access to a network, such as a mobile network and can ascertain where a mobile subscriber 14, 20 is located and transmit messages from the sender 14 mobile unit 12 to the recipient 20 mobile unit 16. Alternately, the sent and received messages may be from pc to pc, pc to mobile unit or from and to any suitable messaging device.

Service center 26 can ascertain if the recipient's mobile 16 is inactive, for example powered down or outside of the coverage area or that the subscriber's mobile is incapable of receiving a message. If the subscriber is inactive, service center 26 can keep the message in queue for a set period where once the subscriber roams back to an active area, the message can be sent. Here, if the mobile unit 16 responds, the center 26 delivers the message to the mobile unit 16 and if the message transmission is successful, the status of the message will be "sent" and center 26 will not attempt to send the message again.

Mobile unit 16 comprises an electronic messaging device adapted to receive electronic messages from sender 14. Mobile unit 16 has a body detection device 18 that is adapted to detect that the electronic messaging device 16 is being carried by the recipient or user 20. After receipt of a notification message from the sender 14, the transmitter sends an acknowledgement message to the sender 14 when the body detection device 18 detects the presence of a recipient 20 of the notification message or where the detection device 18 detects that the electronic messaging device is being carried by the user 20.

The body detection device 18 may comprise a temperature sensor where the temperature sensor detects a temperature of the recipient 20. Alternately, the body detection device 18 may comprise a motion detector where the motion detector detects a movement of the recipient 20. Alternately, the body detection device 18 may comprise both a temperature sensor and a motion detector where the body detection device 18 detects the presence of a recipient 20 of the notification message when the temperature sensor detects a temperature of the recipient 20 and the motion detector detects a movement of the recipient 20. Here, the body detection device 18 detects that the electronic messaging device 16 was actively being carried upon the body of the recipient 20 of the notification message.

As shown, the electronic messaging device may comprise a cellular phone 16. In alternate embodiments, any suitable messaging device may be provided. The acknowledgement message may comprise a copy of the notification message, a unique identifier of the electronic messaging device, a time stamp and a confirmation that the body detector 18 detected the presence of the recipient 20 of the notification message.

Figure 2:
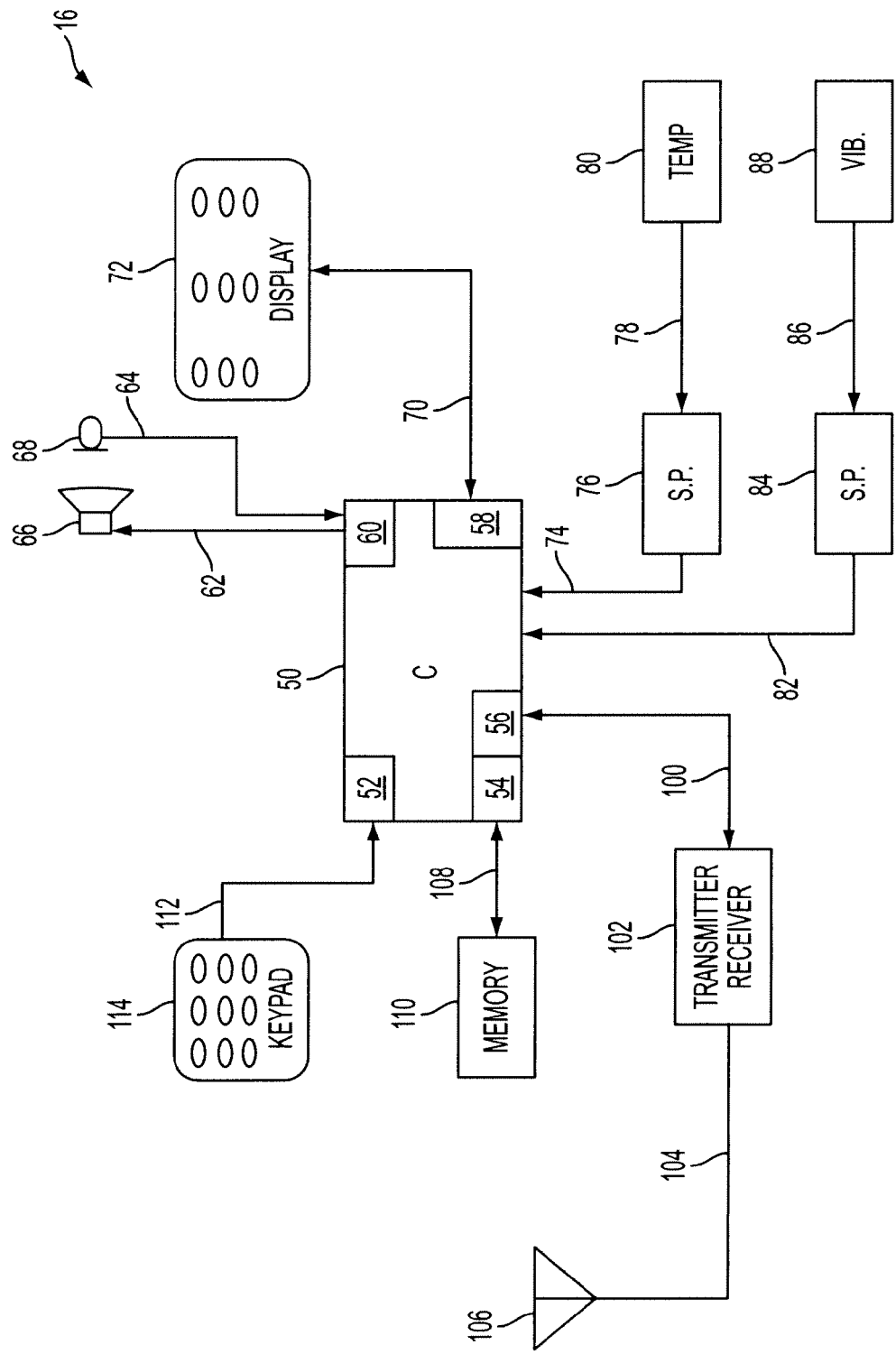
FIG. 2 is a schematic diagram of an electronic messaging device.

Referring now to FIG. 2, there is shown a schematic diagram of an electronic messaging device 16. Here, mobile unit 16 has a controller 50, a transmitter and receiver unit 102 connected to the controller 50, a user interface connected to the controller 50, and a body detection device 88 connected to the controller 50.

As shown, the messaging device 16 may comprise a cellular phone 16 and includes an antenna 106 for transmitting and receiving electromagnetic waves, a speaker 66 for producing sound, for example a voice or a ringtone, a microphone 68 for picking up sound, for example the voice of the user, a display unit 72 may be a liquid crystal display for displaying a message, a telephone number, the content of an electronic mail, a menu screen for selecting various functions offered by an application program, the present time, the condition of electromagnetic waves, operation keys 114 for offering a direct interface to the user.

Device 16 also has a transmitter/receiver unit 102 coupled 104 to antenna 106 which is a communication module for transmitting and receiving speech and data. Device 16 further has controller 50 having a communication control unit 56 coupled 100 to transmitter and receiver 102, a voice processing unit 60 coupled 62 to speaker 66 and 64 to microphone 68, a temperature detector 80 coupled 78 to signal processing unit which is coupled 74 to controller 50, where temperature detector 80 comprises a use detection module for detecting the presence of the user, a motion detector 88 coupled 86 to signal processing unit 84 which is coupled 82 to controller 50 comprises a use detection module for detecting the presence of the user. Memory 110 is coupled 108 to memory interface 54 of controller 50 comprising a ROM or a RAM for storing messages, electronic mails, browsers, software programs related to various applications such as personal schedule management, classified telephone directory, personal schedule data, transmitted and received mails, and data such as of automatic answering machine.

Device 16 further has display control unit 58 interfacing 70 to display 72 for displaying various data such as dynamic image, still image, text and the like on the display unit 72. Device 16 has operation control unit 50 comprising chiefly a CPU for controlling the communication module and for executing the application programs depending upon a direct instruction from the user through the operation keys 114 where operation keys 114 interface 112 to key interface 52 of controller 50. The transmitter/receiver unit 102, communication control unit 56, voice processing unit 60, memory 110, keypad interface 52, operation control unit 50 and display control unit 58 may all be coupled together through a bus or otherwise, so that the necessary data can be exchanged among them.

Referring also to FIG. 1, body detection device 18 may comprise both a sensor and a motion detector where the body detection device 18 detects the presence of a recipient 20 of the notification message when the sensor 80 detects a temperature of the recipient 20 or infrared radiation from the recipient 20 and the motion detector 88 detects a movement of the recipient 20. Here, the body detection device 18 detects that the electronic messaging device 16 was actively being carried upon the body of the recipient 20 of the notification message. Sensor 80 may comprise an infrared temperature detector, thermocouple or other suitable temperature or radiation detector. Sensor 80 may sense the temperature or radiation of the user directly, such as by imaging through a port on the cellular device. Alternately, sensor 80 may sense the temperature of the user indirectly where sensor 80 detects the temperature of the cellular device 16. Signal processor 76 may be used to detect transients and changes in temperature. Controller 50 may be programmed to indicate the presence of a user when either a threshold is met or when a certain transient condition is met.

Vibration sensor 88 may comprise a sensor based on MEMS (Micro-electro mechanical systems) technology, for example, the LIS244AL 2-axis accelerometer/motion detector from ST Microelectronics of Geneva, Switzerland, enable microchip-sized motion detectors based on the vibrations of a silicon needle in a capacitive electric field. These are the class of detectors used to trigger airbags, and incorporated into handheld video game controllers. Alternately, sensor 88 may comprise infrared motion detectors based on pyroelectric crystals that generate a charge in response to infrared radiation may also be incorporated. An example of a miniature infrared motion detector module is the Perkin Elmer PYD 1998 Digital Pyroelectric Infrared Sensor which operates on 4 to 15 volts with 45 microampere draw. In other embodiments, body detection device 18 may include one or more sensors configured for detecting rapid fluctuation of light levels, for example, due to motion. Alternately, body detection device 18 may include one or more sensors configured for detecting pressure changes on display 72, keys 114, or elsewhere on the surface of device 16 resulting from, for example, unrelated recipient activity, that is, recipient activity not directly intended to acknowledge the notification message. In alternate embodiments, any suitable motion detector may be provided. Signal processor 84 may be provided to monitor trends or identify and classify types of movement. Controller 50 may be programmed to indicate the presence of a user when either a state condition is met or when a certain transient condition is met.

Figure 3:
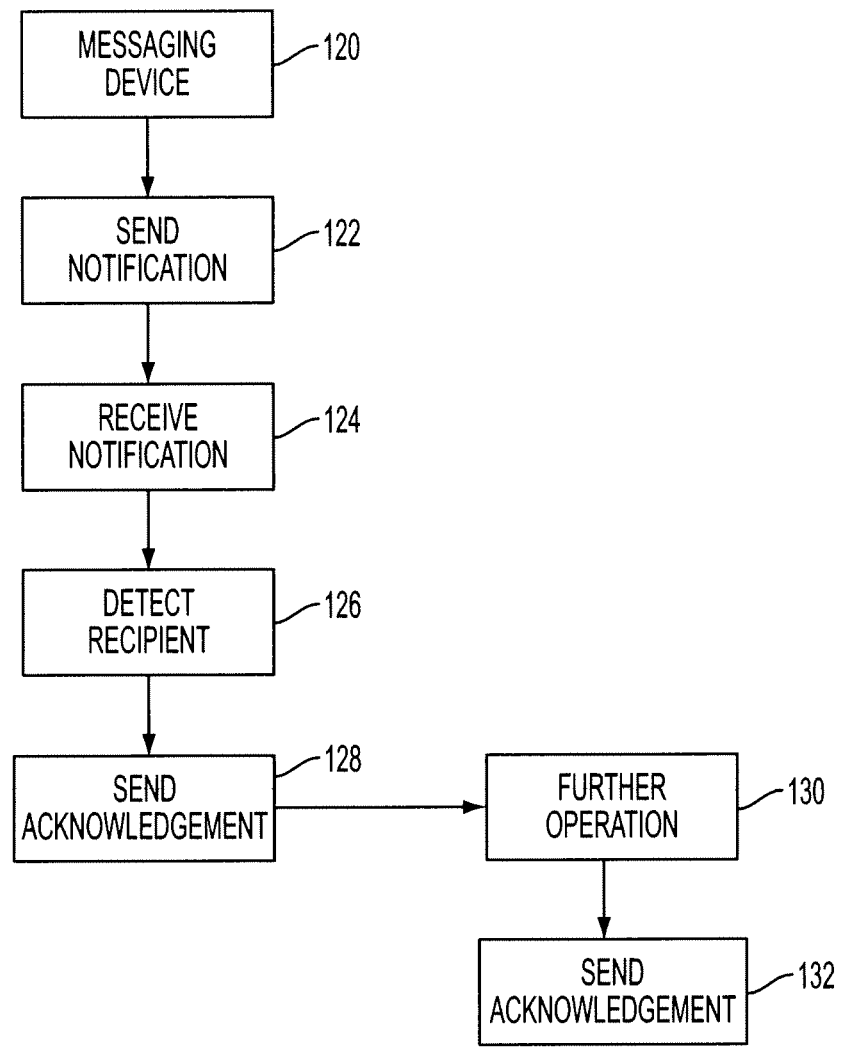
FIG. 3 is a flow diagram of an automated acknowledgement message receipt method.

Referring now to FIG. 3, there is shown a flow diagram of a method for automated acknowledgement of electronic message receipt by confirming that messaging device is being carried by the recipient. The method for automated acknowledgement of electronic message receipt has a step 120 of providing an electronic messaging device having a transmitter and receiver unit and a body detection device. The body detection device detects that the electronic messaging device was actively being carried upon the body of the recipient of the notification message. The body detection device may have a temperature sensor where the temperature sensor detects a temperature of the recipient. The body detection device may include an infrared sensor that detects infrared radiation from the recipient. Alternatively, the body detection device may have a motion detector where the motion detector detects a movement of the recipient. In alternate embodiments, the body detection device may have both a temperature sensor and a motion detector where the body detection device detects the presence of a recipient of the notification message when the temperature sensor detects a temperature of the recipient and where the motion detector detects a movement of the recipient. A body detection device having a combination of an infrared sensor and a motion detector may also be utilized. In alternate embodiments any suitable detection device may be used. A step 122 of sending a notification message to the receiver from a sender is then provided. A step 124 of receiving the notification message is then provided. A step 126 of sending an acknowledgement message from the transmitter to the sender when the body detection device detects the presence of a recipient of the notification message is then provided. The acknowledgement message may have a copy of the notification message, a unique identifier of the electronic messaging device, a time stamp and a confirmation that the body detector detected the presence of the recipient of the notification message. In alternate embodiments, more or less data may be provided in the acknowledgement message. A step 130 of further operation of the electronic messaging device by the recipient is then provided. A step 132 of sending a second acknowledgement message from the transmitter to the sender when the recipient conducts a further operation of the electronic messaging device after receipt of the notification message is then provided.

It should be understood that the foregoing description is only illustrative of the disclosed embodiments. Various alternatives and modifications can be devised by those skilled in the art without departing from the disclosed embodiments. Accordingly, the present disclosed embodiments are intended to embrace all such alternatives, modifications and variances which fall within the scope of the exemplary embodiments.

What is claimed is:

1. A method for automated acknowledgement of electronic message receipt comprising:
   providing an electronic messaging device having a transmitter and receiver unit and a body detection device,
   sending a notification message to the receiver from a sender,
   receiving the notification message, and
   sending an acknowledgement message from the transmitter to the sender when the body detection device detects the presence of a recipient of the notification message without voluntary acknowledgement by the recipient.

2. The method for automated acknowledgement of electronic message receipt of claim 1 further comprising the step of sending a second acknowledgement message from the transmitter to the sender when the recipient conducts a further operation of the electronic messaging device after receipt of the notification message.

3. The method for automated acknowledgement of electronic message receipt of claim 1, wherein the body detection device detects that the electronic messaging device was actively being carried upon the body of the recipient of the notification message.

4. The method for automated acknowledgement of electronic message receipt of claim 1, wherein the body detection device comprises a temperature sensor, and wherein the temperature sensor detects a temperature of the recipient.

5. The method for automated acknowledgement of electronic message receipt of claim 1, wherein the body detection device comprises a motion detector, and wherein the motion detector detects a movement of the recipient.

6. The method for automated acknowledgement of electronic message receipt of claim 1, wherein the acknowledgement message comprises a copy of the notification message, a unique identifier of the electronic messaging device, a time stamp and a confirmation that the body detector detected the presence of the recipient of the notification message.

7. The method for automated acknowledgement of electronic message receipt of claim 1, wherein the body detection device comprises a temperature sensor and a motion detector, and wherein the body detection device detects the presence of a recipient of the notification message when the temperature sensor detects a temperature of the recipient and the motion detector detects a movement of the recipient.

8. An electronic messaging device adapted to receive electronic messages from a sender, the electronic messaging device comprising:
   a controller,
   a transmitter and receiver unit connected to the controller,
   a user interface connected to the controller, and
   a body detection device connected to the controller,
   wherein, after receipt of a notification message from the sender, the transmitter sends an acknowledgement message to the sender when the body detection device detects the presence of a recipient of the notification message without voluntary acknowledgement by the recipient.

9. The electronic messaging device of claim 8, wherein the body detection device comprises a temperature sensor, and wherein the temperature sensor detects a temperature of the recipient.

10. The electronic messaging device of claim 8, wherein the body detection device comprises a motion detector, and wherein the motion detector detects a movement of the recipient.

11. The electronic messaging device of claim 8, wherein the body detection device detects that the electronic messaging device was actively being carried upon the body of the recipient of the notification message.

12. The electronic messaging device of claim 8, wherein the electronic messaging device comprises a cellular phone.

13. The electronic messaging device of claim 8, wherein the acknowledgement message comprises a copy of the notification message, a unique identifier of the electronic messaging device, a time stamp and a confirmation that the body detector detected the presence of the recipient of the notification message.

14. The electronic messaging device of claim 8, wherein the body detection device comprises a temperature sensor and a motion detector, and wherein the body detection device detects the presence of a recipient of the notification message when the temperature sensor detects a temperature of the recipient and the motion detector detects a movement of the recipient.

15. An electronic messaging device adapted to receive electronic messages from a sender, the electronic messaging device comprising:
   a controller,
   a transmitter and receiver unit connected to the controller,
   a user interface connected to the controller, and
   a detection device connected to the controller, the detection device adapted to detect that the electronic messaging device is being carried by a user,
   wherein, after receipt of a notification message from a sender, the transmitter sends an acknowledgement message to the sender when the detection device detects that the electronic messaging device is being carried by the user without voluntary acknowledgement by the user.

16. The electronic messaging device of claim 15, wherein the detection device comprises a temperature sensor, and wherein the temperature sensor detects a temperature of the user.

17. The electronic messaging device of claim 15, wherein the detection device comprises a motion detector, and wherein the motion detector detects a movement of the user.

18. The electronic messaging device of claim 15, wherein the electronic messaging device comprises a cellular phone.

19. The electronic messaging device of claim 15, wherein the acknowledgement message comprises a copy of the notification message, a unique identifier of the electronic messaging device, a time stamp and a confirmation that the detection device detected the presence of the user.

20. The electronic messaging device of claim 15, wherein the detection device comprises a temperature sensor and a motion detector, and wherein the detection device detects the presence of the user when the temperature sensor detects a temperature of the user and the motion detector detects a movement of the user.

* * * * *